United States Patent [19]

Gunda et al.

[11] Patent Number: 4,741,159
[45] Date of Patent: May 3, 1988

[54] POWER TRANSMISSION

[75] Inventors: Rajamouli Gunda, Rochester; Michael R. McCarty, Troy; Melvin A. Rode, West Bloomfield, all of Mich.

[73] Assignee: Vickers, Incorporated, Troy, Mich.

[21] Appl. No.: 944,657

[22] Filed: Dec. 22, 1986

Related U.S. Application Data

[63] Continuation-in-part of Ser. No. 849,542, Apr. 8, 1986.

[51] Int. Cl.⁴ ............................................. F16D 31/02
[52] U.S. Cl. ........................................ 60/443; 60/446; 60/465
[58] Field of Search ................. 60/465, 446, 443, 445, 60/390, 433, 434

[56] References Cited

U.S. PATENT DOCUMENTS

| | | | |
|---|---|---|---|
| 3,748,857 | 7/1973 | Heiser | 60/446 X |
| 4,375,747 | 3/1983 | Friedrich | 60/443 |
| 4,505,111 | 3/1985 | Okamoto et al. | 60/431 |
| 4,507,057 | 3/1985 | Igarashi et al. | 417/218 X |

Primary Examiner—William E. Wayner
Attorney, Agent, or Firm—Barnes, Kisselle, Raisch, Choate, Whittemore & Hulbert

[57] ABSTRACT

An electrohydraulic servo system which includes a plurality of pressure compensated flow control servo valves for feeding hydraulic fluid from a variable displacement pump to associated actuators and loads. A closed-loop velocity-control servo system is coupled to each servo valve, and is responsive to velocity command inputs from an operator and to feedback signals from the respective loads for providing flow control signals to the respective servo valves. A pump controller receives the valve flow control signals, derives associated valve flow rates from predetermined functional characteristics of the pressure compensated valves, and obtains a total flow demand as a function of the sum of the indicated individual valve flow rates. A pump displacement command is derived as a combined function of total flow demand and pump speed to accommodate volumetric inefficiencies which vary with speed, and the displacement command signal is fed to a pump displacement servo control loop for controlling pump output. Displacement command is limited as a function of power available at the engine coupled to the pump to prevent engine stall.

24 Claims, 3 Drawing Sheets

POWER TRANSMISSION

This application is a continuation-in-part of application Ser. No. 849,542 filed Apr. 8, 1986.

The present invention relates to electrohydraulic servo control systems, and more particularly to flow control at an electrohydraulic pump coupled to a plurality of loads.

BACKGROUND AND OBJECTS OF THE INVENTION

In conventional electrohydraulic servo control systems, a pump is coupled through a plurality of pressure compensated flow control servo valves to a corresponding plurality of loads, such as hydraulic actuators or motors. In a typical application, the moving components of an earth excavator may be coupled to electrohydraulic actuators controlled by a master controller responsive to operator lever or joystick inputs. The pump is controlled to deliver an output pressure equal to the highest load pressure plus an incremental load sensing pressure drop, which is a function of servo valve design. Typically, a network of shuttle valves is coupled to the various loads and delivers an output to the pump control input indicative of highest load pressure. The pump is mechanically controlled to deliver an output pressure equal to such highest load pressure plus the load sensing pressure drop of the servo valve coupled to that load.

It has been proposed to eliminate the shuttle valve network, and to provide pump control by electronically sensing actual pressure at the various loads. Such a system requires pressure sensors at both of the servo valve ports at each load, a pressure sensor at the pump output, and a corresponding multiplicity of conductors for feeding the pressure sensor signals to an electronic pump controller. Although enhanced control characteristics can be obtained reduction in cost and complexity remains desirable.

It is therefore a general object of the present invention to provide an electrohydraulic servo system of the described character which exhibits reduced cost and complexity as compared with prior art systems of similar type. A further and more specific object of the invention is to provide an electrohydraulic servo system of the described type which includes pressure compensated flow control valves coupled to the various loads, and a pump controller responsive to flow demand at the several valves for controlling pump output to supply the sum of such demands. A further and yet more specific object of the invention is to provide an electrohydraulic system having a pump controller as described which automatically compensates for changes in pump input speed.

SUMMARY OF THE INVENTION

In accordance with the present invention, an electrohydraulic servo control system includes a pressure compensated flow control valve for proportionally variably feeding hydraulic fluid to a load at a fluid flow rate or velocity which is a predetermined proportional function of an electronic valve control signal. A variable output pump, such as a variable displacement pump, is coupled to a source of motive power to feed hydraulic fluid under pressure from a source to the servo valve. A pump controller provides a displacement control input to the pump and includes circuitry responsive to the valve control signal for controlling pump displacement as a function of fluid flow required at the valve.

In a preferred embodiment of the invention, a plurality of pressure compensated flow control valves proportionally variably feed hydraulic fluid to a corresponding plurality of loads at fluid flow rates which vary as individual predetermined proportional functions of electrical control signals to the valves. An electronic servo control is coupled to each valve and includes circuitry for receiving input command signals indicative of motion desired at the corresponding load and feedback signals indicative of actual motion at the load. A control signal is generated and transmitted to each valve as a function of a difference between the corresponding input and feedback signals. The valve control signal is indicative of fluid flow velocity at the valve required to obtain desired motion at the corresponding load. The pump controller receives all of the valve control signals from the several servo controllers and provides a control signal to the pump as a function of the sum of the several valve fluid flow rates needed to obtain desired motion.

In accordance with another feature of the invention, the pump control signal is provided as a combined function of flow demand and pump speed. That is, the pump displacement command is obtained as a function of the relationship $b*Q_c/N$, where $Q_c$ is total flow demand, N is pump speed, and b is a variable which depends upon pump speed and thus accounts for volumetric inefficiencies at the pump as a factor of speed.

Yet another feature of the invention contemplates limitation of pump displacement as a function of power available at the pump power source—e.g., the vehicle engine. A sensor is coupled to the engine throttle for providing a signal indicative of engine speed desired by the operator. If measured engine speed drops below such desired engine speed, the pump is off-stroked to reduce engine load and allow the engine to return to desired speed. The command signals to the valve controller are correspondingly scaled so that the valves are not commanded to provide more fluid than the pump can supply.

BRIEF DESCRIPTION OF THE DRAWINGS

The invention, together with additional objects, features and advantages thereof, will be best understood from the following description, the appended claims and the accompanying drawings in which:

DESCRIPTION OF PREFERRED EMBODIMENT

Figure 1:
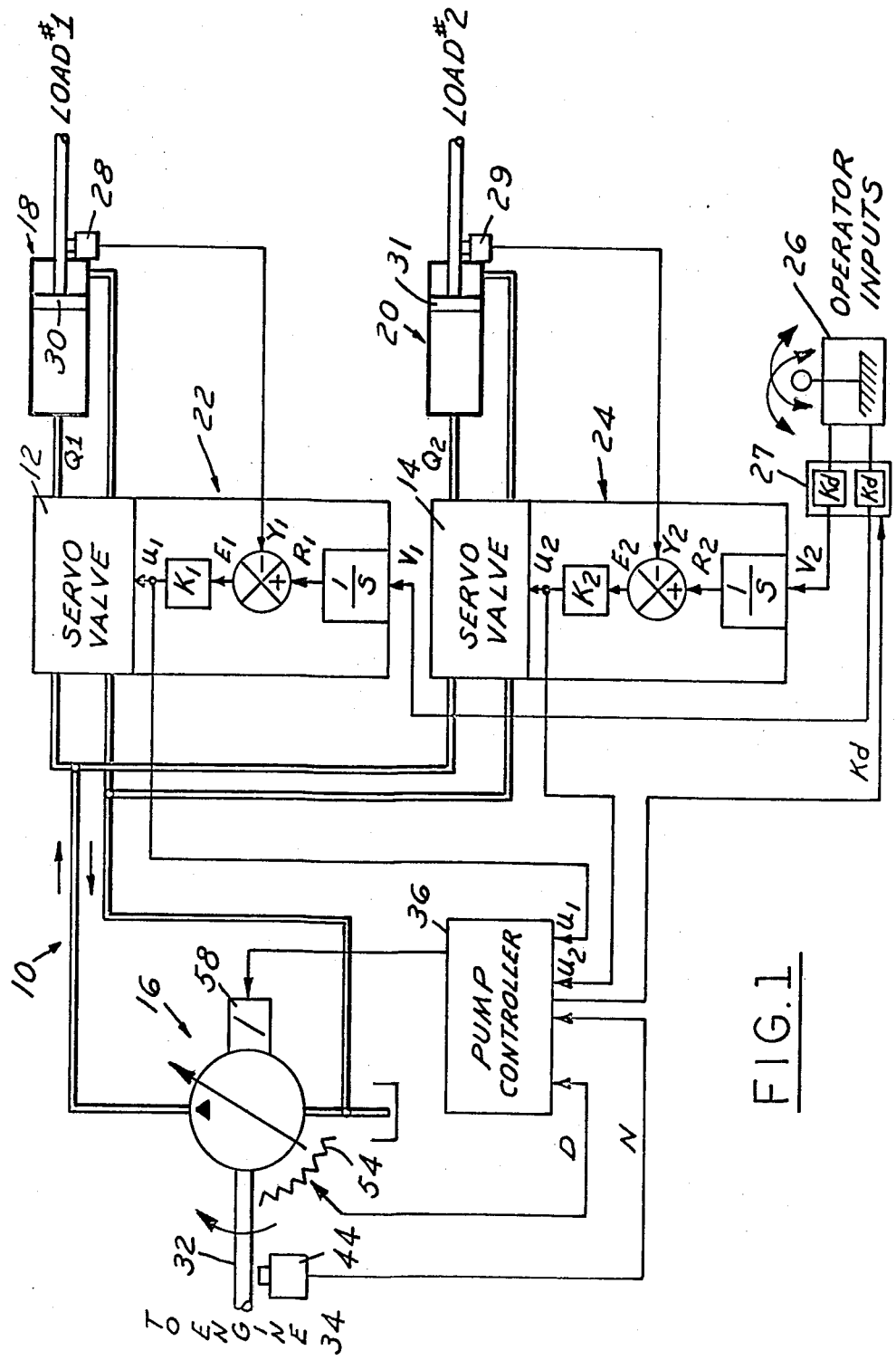
FIG. 1 is a functional block diagram of an electrohydraulic servo system in accordance with a presently preferred embodiment of the invention.
Figure 2:
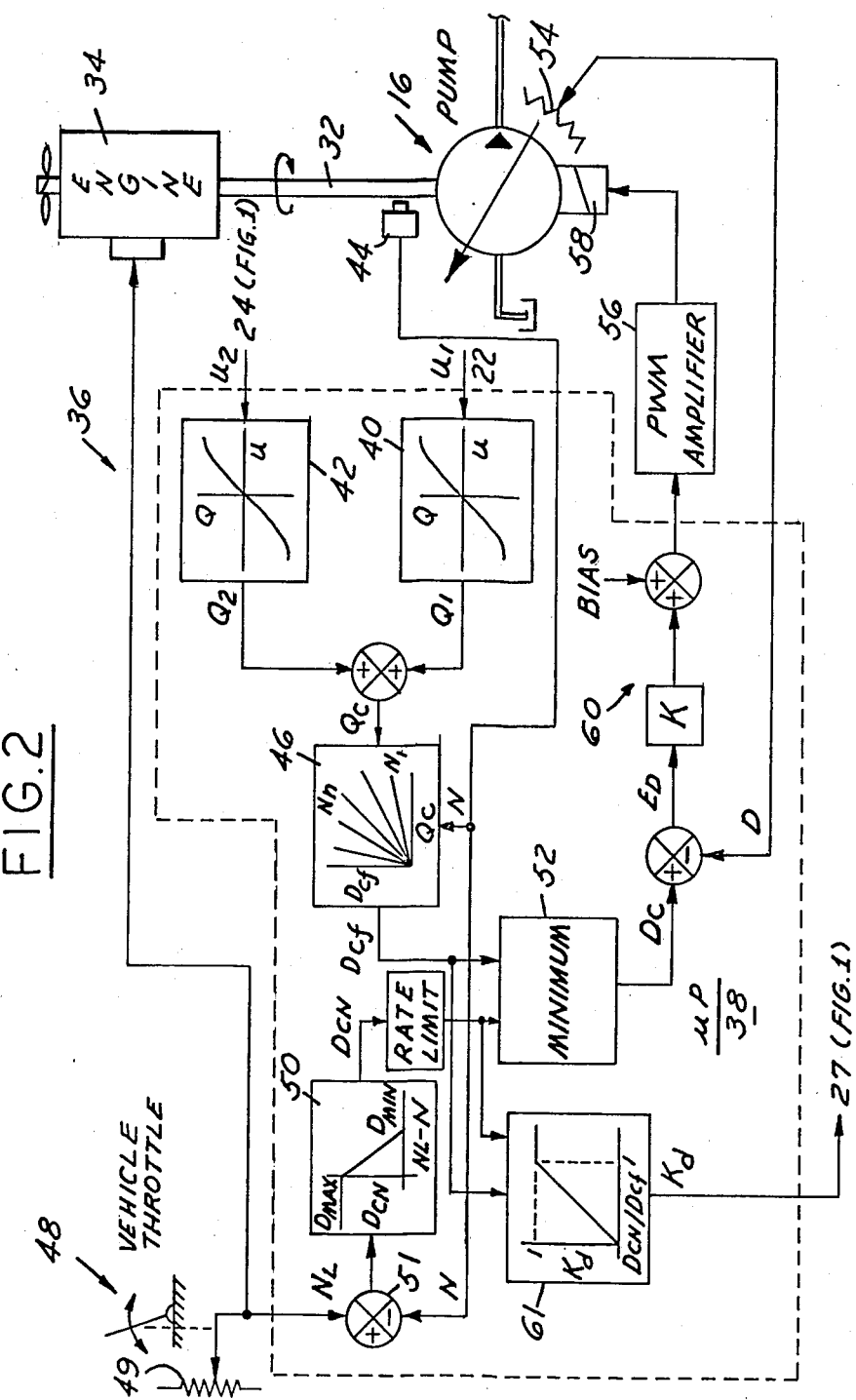
FIG. 2 is a detailed functional block diagram of the pump controller illustrated in FIG. 1.

FIG. 1 illustrates an electrohydraulic servo system 10 in accordance with an exemplary embodiment of the invention as comprising a pair of servo valves 12, 14 coupled to a variable displacement pump 16 for variably feeding hydraulic fluid from pump 16 to respective linear actuators 18, 20. Each valve 12, 14 has an associated electronic valve controller 22, 24 respectively responsive to input velocity commands V1 and V2 from an operator joystick 26 or the like through a master controller 27 for obtaining desired motion at actuators 18, 20 and the associated loads coupled thereto. More specifically, input velocity command V1 is first integrated within controller 22 (the variable "S" being the conventional Laplace variable) to provide a position command signal R1. A sensor 28 is coupled to the piston 30 of actuator 18 and provides a feedback signal Y1 indicative of actual position of actuator piston 30, and thus actual position of Load-1 coupled thereto. An error signal E1 indicates a difference between desired and actual position signals R1 and Y1, and is fed through an amplifier having gain K1 to obtain a valve flow command signal U1. Servo valve 12 is a pressure compensated flow control valve which feeds fluid to actuator 18 at a flow rate or velocity Q1 which is a predetermined proportional function of flow command signal U1, (see 140 in FIG. 2). Valve controller 24 in the embodiment of FIG. 1 is identical to controller 22 hereinabove described, with the corresponding elements and signals being designated by the suffix "2".

Valve 12, actuator 18 and valve controller 22, and valve 14, actuator 20 and valve controller 24, thus each comprise a closed-loop velocity-control servo valve and actuator system responsive to velocity input commands V1, V2 from joystick 26 for varying rate of fluid flow through servo valves 12, 14, and thereby obtaining desired motion at the loads coupled to actuators 18, 20. Most preferably, each valve/controller combination 12, 22 and 14, 24 comprises a single unit or assembly as disclosed in copending application Ser. No. 849,540, filed Apr. 8, 1986 and assigned to the assignee hereof. The disclosure of such copending application is incorporated herein by reference for disclosure of such preferred valve assembly structure.

Pump 16 (FIGS. 1 and 2) comprises a variable displacement pump having an input shaft 32 coupled to a source 34 of motive power, such as the engine of an earth excavator in the example noted hereinabove. Pump 16 is coupled to and controlled by a pump controller 36 which includes a programmed microprocessor 38 illustrated functionally in FIG. 2. The valve flow command signals U1, U2 are received at pump controller 36 from valve controllers 22, 24. Valve flows Q1, Q2 correspnding to each flow command U1, U2 are obtained, preferably by referring to a look-up table 40, 42 in which the flow characteristics Q of respective valves 12, 14 are prestored as a function of input flow command U. Although the flow/command characteristics are illustrated as being identical at 40, 42 in FIG. 2, it will be appreciated that such need not be the case where differing sizes of servo valves are coupled to correspondingly different sizes of actuators and loads. As is well known in the art, flow Q does not vary linearly with flow command U. Reference look-up tables 40, 42 may be obtained empirically for each servo valve 12, 14, or may be derived from design data for a particular model and size of servo valve.

Signals Q1, Q2, indicative of individual valve fluid flows are summed to obtain total or composite fluid flow Qc. In general, total displacement required at pump 16 to supply fluid at rate Qc is equal to Qc divided by pump speed N received from a pump speed sensor 44. However, this relationship does not account for volumetric efficiencies at pump 16 as a function of pump speed. Accordingly, pump displacement Dcf required to supply fluid at flow rate Qc at pump speed N is determined according to the relationship Dcf=b*Qc/N, where b is a parameter which varies with pump speed N. In accordance with the preferred embodiment of the invention illustrated in FIG. 2, the foregoing relationship is implemented in a further look-up table 46 which relates composite flow Qc to necessary pump displacement Dcf for differing incremental values N1...Nn of pump speed N. The variable b is the slope of each curve N1...Nn in FIG. 2. For values of N between incremented values N1...Nn, suitable interpolation is employed. The resulting signal Dcf thus indicates total pump displacement required to yield fluid at flow rate Qc at measured pump speed N. (Dcf can be greater than Dmax.)

To prevent pump 16 from being stroked to a level which will overload engine 34, a speed limit command NL is received from the vehicle throttle 48 through a potentiometer 49 or other suitable transducer and indicates power available at engine 34. Speed limit NL is compared at 51 with actual pump speed N. the resulting difference NL-N is examined at 50 to establish a displacement command Dcn based upon pump speed. The two displacement command signals Dcn and Dcf are examined at 52, and the lesser of the two is selected as pump displacement command signal Dc. Pump displacement command Dc is compared with actual pump displacement D indicated at the sensor 54 responsive to pump yoke position. The difference or error Ed is multiplied by a constant K, subjected to compensation for bias or offset, and then controls duty cycle of pulse-width modulation amplifier 56. The output of amplifier 56 is fed to the displacement control solenoid 58 of pump 16. Most preferably, the output Dcn of module 50 is limited at a rate selectable by the operator to prevent cycling of engine speed about the limit NL.

Commands Dcn and Dcf are also fed to a module 61 where the ratio Dcn/Dcf is obtained. As long as this ratio is equal to or greater than one, meaning that pump speed N is above the limit NL, the output Kd is equal to one. However, if the ratio Dcn/Dcf is less than one, the value is fed as the parameter Kd to master controller 27 (FIG. 1). Input commands from operator joystick 26 are multiplied by the parameter Kd, so that velocity commands V1, V2 to servo controller 22, 24 are effectively scaled to a level which the engine and pump can supply. Thus, pump 16 is off-stroked, and load motion commands are correspondingly reduced, when engine speed drops. This permits the engine to maintain service to other systems coupled thereto, such as vehicle steering or braking, which have higher priority.

Thus, in operation, pump controller 36 receives electrical input signals indicative of flow command signals U1, U2 at the servo valves, and derives therefrom corresponding valve flows Q1, Q2 based upon the predetermined and unique functional relationship of valve flow to flow command in pressure compensated flow control servo valves. Individual servo valve flows are summed to obtain a composite flow Qc. Necessary pump displacement Dcf is then obtained as a function of total flow Qc and pump speed N. As long as required displacement so indicated is below the overload level of the pump-drive engine, pump displacement Dcf based upon total required fluid flow is employed as the displacement command Dc at the input to the pump control servo loop 60.

Figure 3:
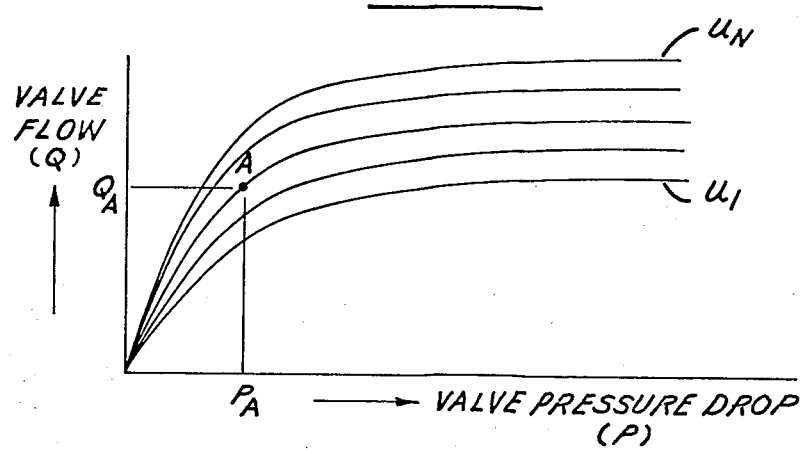
FIGS. 3 and 4 are graphic illustrations which are useful in describing operation of the embodiment of FIGS. 1 and 2.
Figure 4:
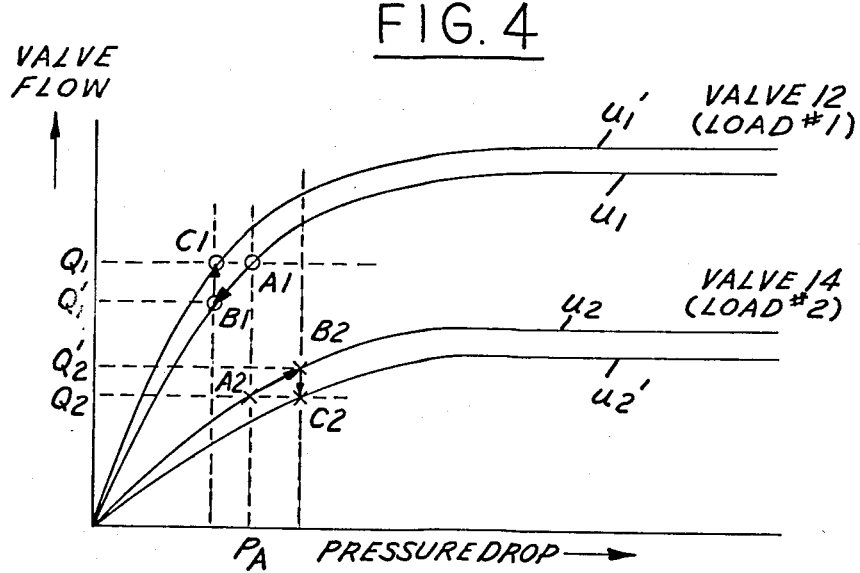

FIG. 3 illustrates a family of curves relating valve flow Q to pressure drop P across a pressure compensated flow control servo valve for various valve flow control inputs U1-Un (and corresponding valve pilot pressures). In accordance with prior art hereinabove discussed, it was attempted to maintain pressure across the valve associated with the greatest load at the load sensing pressure Pa, and thereby obtain corresponding flow Qa through that valve. In accordance with the present invention, however, an entirely different approach is taken. That is, the pump is controlled to deliver flow Qa based upon known valve command input U (and corresponding pilot pressure), and valve pressure drop Pa becomes the dependent variable. The result, in terms of automatically stabilizing valve flow under varying load conditions, is illustrated in FIG. 4. Initially, it is assumed that the two pressure controlled servo valves 12, 14 are operating at point A1, A2 on the associated curves, having identical pressure drops Pa and corresponding flows Q1 and Q2. If Load-1 at valve 12 encounters increased resistance, the pressure drop across valve 12 automatically decreases from point A1 to point B1, with corresponding decrease in flow from Q1 to Q1'. Meanwhile, since pump output remains constant, pressure at valve 14 increases from point A2 to point B2, and valve flow correspondingly increases from Q2 to Q2'. However, such change in fluid flow automatically results in a change in velocity at each load, decreasing at Load-1 and increasing at Load-2. Such changes in velocity result in changing error signals within the respective valve controllers 22, 24, automatically increasing the flow command at valve 12 from U1 to U1' while decreasing the flow command at valve 14 from U2 to U2'. Operation at the respective valves thus automatically shifts to the points C1 and C2 in FIG. 4 at which valve flows return to the initial levels of Q1 and Q2 respectively, while pressure drop across the respective valves vary from the initial Pa level because of change in load conditions.

Although the invention has been disclosed in connection with a specific presently preferred embodiment thereof, many alternatives and modifications may be implemented without departing from the principles of the invention. For example, position and acceleration servo loops, or combinations of position, velocity and acceleration, may be employed in servo controllers 22, 24. The invention is by no means limited to a pair of loads or to linear actuators as illustrated in FIG. 1. Indeed, benefits of implementation of the invention increase as the number of loads increases. Nor are the principles of the invention limited specifically to variable displacement-type pumps, although these are preferred.

A microprocessor-based pump controller 36 has been disclosed, and is currently preferred. However, both the pump and valve controllers could be constructed of discrete digital or analog circuitry without departing from the invention in its broadest aspects. Look-up tables have been described in connection with modules 40-46 in FIG. 2, and are currently preferred for reasons of speed and versatility. However, the look-up table functions could be performed by mathematical operations in analog or digital circuitry.

The invention claimed is:

1. An electrohydraulic servo system which includes, in combination, a pressure compensated flow control servo valve for proportionally variably feeding hydraulic fluid to a load at a flow rate which is a predetermined proportional function of an electronic valve control signal, a variable output pump for coupling to a source of motive power to feed hydraulic fluid under pressure from a source to said servo valve, pump control means for controlling output of said pump, and an electronic servo control coupled to said valve and including means for receiving a first signal indicative of motion desired at the load, means for receiving a second signal indicative of actuation motion at the load and means for generating said valve control signal to said valve as a function of a difference between said first and second signals, said valve control signal being indicative of fluid flow velocity at said valve required to obtain said desired motion at the load, characterized in that said pump control means comprises:

means for receiving said valve control signal, means for providing a signal indicative of fluid flow rate at said valve as said predetermined function of said valve control signal, and means for providing an output control signal to said pump as a function of said flow-indicative signal.

2. The system set forth in claim 1 wherein said means for providing said flow-indicative signal comprises first look-up table means relating flow rate to valve command signal at said predetermined function associated with said valve.

3. The system set forth in claim 1 further comprising means for sensing speed of motive input power to said pump and providing a corresponding speed signal, and wherein said pump control means comprises means for providing said output control signal to said pump as a combined function of said flow-indicative signal and said speed signal.

4. The system set forth in claim 1 wherein said source of motive power comprises an engine, and wherein said pump control means further comprises means responsive to throttle commands to said engine for limiting said output control signal to said pump to a level below overload on said engine.

5. The system set forth in claim 1 comprising a plurality of said pressure compensated flow control servo valves for variably feeding hydraulic fluid to a corresponding plurality of loads at flow rates which are predetermined functions of corresponding valve control signals, and wherein said pump control means comprises means for receiving all of said valve control signals, means for providing a plurality of signals indicative of fluid flow rates at said valves as corresponding said predetermined functions of said plurality of valve control signals, and means for controlling output of said pump as a function of a sum of said plurality of flow-indicative signals.

6. An electrohydraulic servo system which includes a pressure compensated flow control servo valve for variably feeding hydraulic fluid to a load at a flow rate which is a predetermined function of an electronic valve control signal, a variable output pump for coupling to a source of motive power to feed hydraulic fluid under pressure from a source to said servo valve, and pump control means for controlling output of said pump, characterized in that said pump control means comprises:

means for receiving said valve control signal, means for providing a signal indicative of fluid flow rate at said valve as said predetermined function of said valve control signal, means for sensing speed of motive input power to said pump and providing a corresponding speed signal, and means for providing an output control signal to said pump as a combined function of said flow-indicative signal and said speed signal.

7. The system as set forth in claim 6 wherein said pump control means comprises for providing said output control signal as a function of the relationship b*Qc/N, where Qc is said flow-indicative signal, N is said speed signal, and b is a constant selected as a function of speed N.

8. The system set forth in claim 7 wherein said output control signal providing means comprises look-up table means relating said output control signal to said flow-indicative signal as differing predetermined functions of said speed signal.

9. An electrohydraulic servo system which includes a pressure compensated flow control servo valve for variably feeding hydraulic fluid to a load at a flow rate which is a predetermined function of an electronic valve control signal, a variable output pump for coupling to an engine to feed hydraulic fluid under pressure from a source to said servo valve, and pump control means for controlling output of said pump, characterized in that said pump control means comprises:

means for receiving said valve control signal, means for providing a signal indicative of fluid flow rate at said valve as said predetermined function of said valve control signal, means for providing an output control signal to said pump as a function of said flow-indicative signal, and means responsive to throttle commands to said engine for limiting said output control signal to said pump to a level below overload on said engine.

10. The system set forth in claim 9 wherein said throttle command-responsive means comprises means responsive to the engine throttle for providing a signal indicative of desired engine speed set by said throttle, means for sensing speed of motive input power to said pump and providing a corresponding pump speed signal, means for comparing said desired-speed signal with said pump-speed signal, and means for limiting said output control signal where said pump-speed signal is less than said desired-speed signal.

11. An electrohydraulic servo system comprising
a valve for variably feeding hydraulic fluid to a load at a flow rate which varies as a function of electronic valve control signals to said valve,
an engine including a throttle for selectively setting desired speed at said engine,
a variable output pump coupled to said engine for feeding fluid under pressure from a source to said valve, and
pump control means for controlling output of said pump comprising means responsive to said engine throttle for providing a signal indicative of desired engine speed set by said throttle, means for sensing speed of said pump and providing a corresponding pump speed signal, means for comparing said desired-speed signal with said pump-speed signal, means responsive to said valve control signal for providing a pump output control signal to said pump, and means for limiting said output control signal where said pump-speed signal is less than said desired-speed signal.

12. The system set forth in claim 11 further comprising means for scaling each of said first signals as a function of a ratio between said first and second pump control signals.

13. An electrohydraulic servo system comprising
a plurality of pressure compensated flow control valves for variably feeding hydraulic fluid to a corresponding plurality of loads at fluid flow rates which vary as individual predetermined functions of electrical control signals to said valves,
an electronic serve control coupled to each of said valves and including means or receiving a first signal indicative of motion desired at the corresponding load, means for receiving a second signal indicative of actual motion at said corresponding load, and means for generating a valve control signal to said valve as a function of a difference between said first and second signals, each said valve control signal being indicative of fluid flow velocity at the corresponding said valve required to obtain said desired motion at the associated load,
a pump for coupling to a source of motive power variably to feed hydraulic fluid under pressure from a fluid source to said plurality of valves, and
pump control means comprising means for receiving said valve control signals from each said electronic servo control, means for providing a signal indicative of fluid flow rate at each said valve as said predetermined function of the corresponding said valve control signal, and means for controlling output fluid flow from said pump to said valves as a function of a sum of said fluid flow rate-indicative signals.

14. The system set forth in claim 13 comprising means for sensing speed of motive input power to said pump and providing a corresponding speed signal, and wherein said output fluid-controlling means comprises means for providing a flow control signal to said pump as a combined function of said sum of said fluid flow rate-indicative signals and said speed signal.

15. The system set forth in claim 14 wherein said output fluid-controlling means comprises means for providing said fluid control signal as a function of the relationship b*Qc/N, where Qc is said sum of said fluid flow rate-indicative signals, N is said speed signal, and b is a constant which varies as a predetermined function of speed N.

16. The system set forth in claim 14 wherein said flow control signal-providing means comprises a look-up table relating said flow control signal to said sum as differing predetermined functions of said speed signal.

17. The system set forth in claim 14 wherein said source of motive power comprises an engine, and wherein said pump control means further comprises means responsive to throttle commands to said engine for limiting said output control signal to said pump to a level below overload on said engine.

18. The system set forth in claim 17 wherein said throttle command-responsive means comprises means responsive to the engine throttle for providing a signal indicative of desired engine speed set by said throttle, means for sensing speed of motive input power to said pump and providing a corresponding pump speed signal, means for comparing said desired-speed signal with said pump-speed signal, and means for limiting said output control signal where said pump-speed signal is less than said desired-speed signal.

19. The system set forth in claim 18 wherein said means for providing said flow control signal to said pump comprises means for providing a first pump control signal as a function of said rate-indicative signals; and wherein said output-limiting means comprises means for providing a second pump control signal as a function of a difference between said desired-speed signal and pump speed signal, and means for controlling said pump as a function of the lesser of said first and second pump control signals.

20. The system set forth in claim 19 further comprising means for scaling each of said first signals as a function of a ratio between said first and second pump control signals.

21. The system set forth in claim 19 wherein said output-limiting means further comprises means for selectively clamping rate of change of said second pump control signal.

22. The system set forth in claim 21 wherein said means for providing said flow control signal to said pump comprises means for providing a first pump control signal as a function of said rate-indicative signals; and wherein said output-limiting means comprises means for providing a second pump control signal as a function of a difference between said desired-speed signal and pump speed signal, and means for controlling said pump as a function of the lesser of said first and second pump control signals.

23. The system set forth in claim 22 wherein said output-limiting means further comprises means for selectively clamping rate of change of said pump control signal.

24. An electrohydraulic servo system which includes a plurality of pressure compensated flow control servo valves for variably feeding hydraulic fluid to a corresponding plurality of loads at flow rates which are predetermined functions of corresponding electronic valve control signals, a variable output pump for coupling to a source of motive power to feed hydraulic fluid under pressure from a source to said servo valves, and pump control means for controlling output of said pump, characterized in that said pump control means comprises:

means for receiving all of said valve control signals,
means for providing a plurality of signals indicative of fluid flow rates at said valves as corresponding said predetermined functions of said valve control signals, and means for providing an output control signal to said pump as a function of a sum of said plurality of flow-indicative signals.

* * * * *